United States Patent
Neumiller et al.

[11] Patent Number: 6,141,559
[45] Date of Patent: Oct. 31, 2000

[54] METHOD AND APPARATUS FOR PERFORMING SELECTION AND DISTRIBUTION IN A COMMUNICATION SYSTEM

[75] Inventors: Phillip D. Neumiller, Cary; Paul M. Popowski, Palatine; Ron Rotstein, Buffalo Grove, all of Ill.

[73] Assignee: Motorola, Inc., Schaumburg, Ill.

[21] Appl. No.: 09/497,354

[22] Filed: Feb. 3, 2000

Related U.S. Application Data

[62] Division of application No. 09/185,899, Nov. 4, 1998.

[51] Int. Cl.$^7$ ........................................................ H04Q 7/20

[52] U.S. Cl. .................. 455/525; 455/453; 455/442; 455/443; 455/450

[58] Field of Search ...................... 455/453, 432, 455/436, 437, 439, 442, 438, 455, 452, 443, 450; 370/331, 332

[56] References Cited

U.S. PATENT DOCUMENTS

| | | | |
|---|---|---|---|
| 5,504,935 | 4/1996 | Vercauteren | 455/442 |
| 5,796,722 | 8/1998 | Kotzin et al. | 455/453 |
| 5,835,490 | 11/1998 | Park et al. | 370/342 |
| 5,991,628 | 11/1999 | Pedziwiatr et al. | 455/443 |
| 6,069,871 | 5/2000 | Sharma et al. | 370/209 |

*Primary Examiner*—Daniel S. Hunter
*Assistant Examiner*—Yemane Woldetatios
*Attorney, Agent, or Firm*—Kenneth A. Haas

[57] ABSTRACT

A communication system (100) that includes base stations (103–109) comprising selection circuitry (207) is provided herein. The determination of a call anchoring base station (base station performing Code Division Multiple Access (CDMA) frame selection) is made based on the base station with a lowest mean work load. During communication with a remote unit (113), frames received by non-call anchoring base stations (105, 107) are backhauled to a switch (101). The switch (101) then sidehauls the frames to the call anchoring base station (103), where selection and call processing functions for the particular call takes place.

4 Claims, 4 Drawing Sheets

METHOD AND APPARATUS FOR PERFORMING SELECTION AND DISTRIBUTION IN A COMMUNICATION SYSTEM

The present application is a Div of application Ser. No. 09/185,899, filed on Nov. 4, 1998, which is hereby incorporated by reference, and priority thereto for common subject matter is hereby claimed.

FIELD OF THE INVENTION

The present invention relates generally to wireless communication systems and in particular, to performing selection within such wireless communication systems.

BACKGROUND OF THE INVENTION

Selection and distribution within wireless communication systems is known in the art. One such communication system employing selection/distribution is a Code Division Multiple Access (CDMA) communication system as described in Cellular System Remote unit-Base Station Compatibility Standard of the Electronic Industry Association/Telecommunications Industry Association Interim Standard 95A (IS95-A), which is incorporated by reference herein. (EIA/TIA can be contacted at 2001 Pennsylvania Ave. NW Washington DC 20006). As described in IS-95A, as a remote unit moves to the edge of a cell, it may commence communication with an adjacent base station, while the current base station continues to handle the call. The call is then handled simultaneously by both base stations. During such a scenario, the remote unit is said to be in soft handoff. Soft handoff provides diversity of forward traffic channels and reverse channel paths on the boundaries between base stations. Each base station involved in a particular soft handoff, demodulates the traffic channel frames and provides the frames to a selector function. The selector function then selects the best frame from each of the active call legs and that frame is forwarded on to the rest of the communication network. Likewise, the communication network provides frames to a distribution function that are to be transmitted to the remote unit. The distribution function distributes these frames to all base stations involved in soft handoff with the remote unit.

In current CDMA communication systems, to support soft handoff, all selection/distribution functions take place in software/hardware entities (e.g., Mobile Switching Centers (MSCs), Centralized Base Station Controllers (CBSCs), . . . , etc.) apart from base stations within the communication system. Base stations within prior-art communication systems are simply hard-wired to a single selection unit that does not vary with time. While such a configuration is adequate for existing CDMA communication systems, this configuration is inadequate for next generation CDMA communication systems, since all next generation CDMA systems virtually eliminate the need for MSCs and CBSCs. Therefore, a need exists for a method and apparatus for performing selection/distribution within a communication system that is capable of accommodating next generation CDMA communication systems.

DETAILED DESCRIPTION OF THE DRAWINGS

Figure 1:
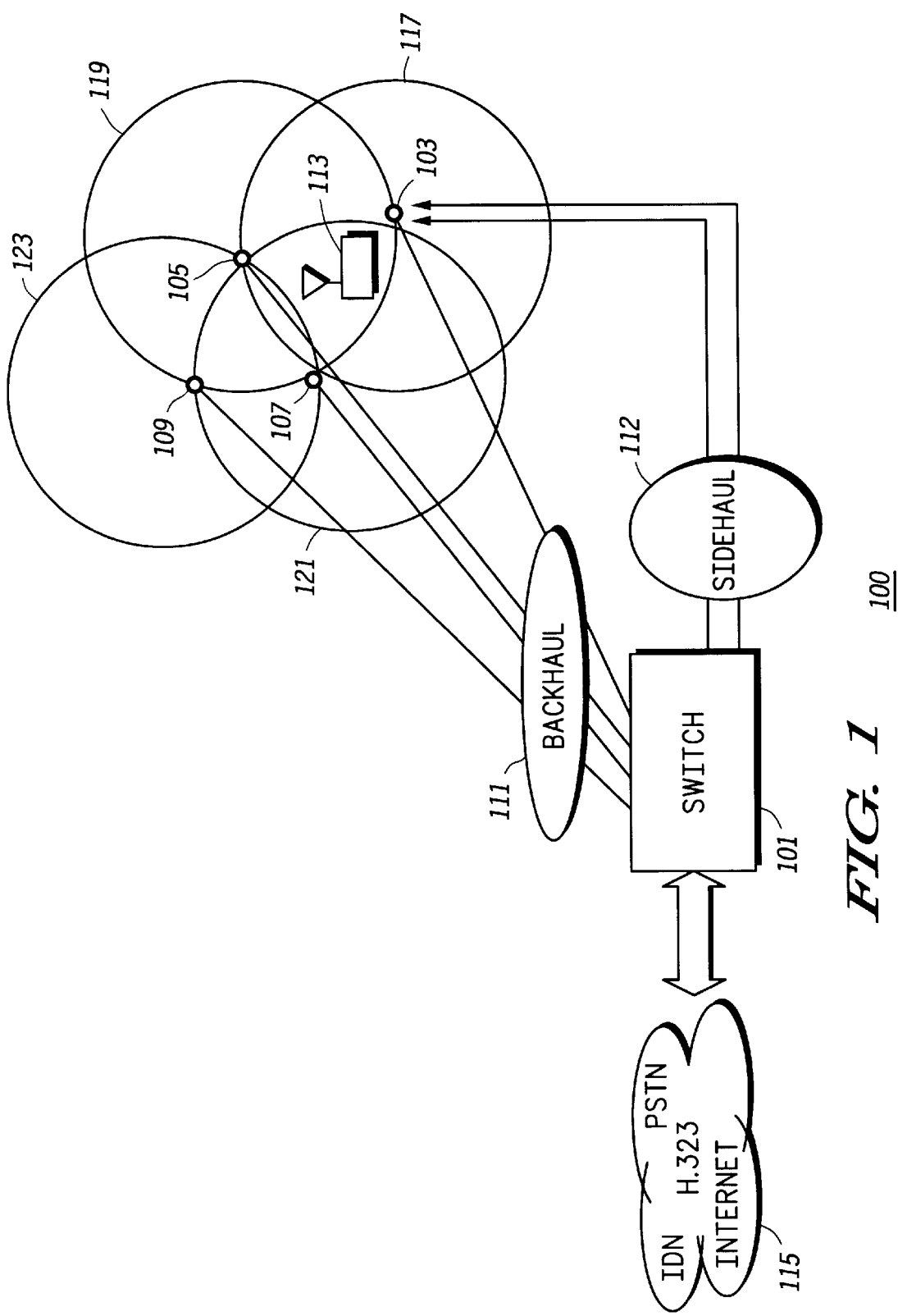
FIG. 1 is a block diagram of a communication system in accordance with the preferred embodiment of the present invention.

To address the need for selection within a communication system, a method and apparatus for performing selection/distribution within a communication system is provided. In the preferred embodiment of the present invention selection/distribution takes place internal to base stations within the communication system. The communication system includes base stations having internal selection/distribution circuitry. The determination of a call anchoring base station (base station performing CDMA frame selection/distribution) is made based on the base station with a lowest mean work load. During selection, frames received from a remote unit by non-call anchoring base stations are back-hauled to a switch. The switch then sidehauls the frames to the call anchoring base station, where selection and call processing functions for the particular call takes place. During distribution, frames received from a network are relayed to the call anchoring base station. The call anchoring base station then sidehauls the frames to all base stations in soft handoff with the remote unit.

The present invention encompasses a method for performing selection within a communication system. The method comprising the steps of determining a work load metric for a base station, and performing selection functions based on the work load metric. In the preferred embodiment of the present invention the decision of whether a base station is going to act as an anchor base station for a particular call is made on a call-by-call basis.

The present invention additionally encompasses a method for performing selection within a communication system. The method comprises the steps of receiving at a base station, a first communication from a first remote unit in soft handoff with a first plurality of base stations and receiving at the base station, a second communication from a second remote unit in soft handoff with a second plurality of base stations. A statistic is determined for the base station the first plurality of base stations, and the second plurality of base stations and selection functions are performed for the first communication from the first remote unit based on the statistic. The base station fails to perform selection functions for the second communication from the second remote unit based on the statistic.

Finally, the present invention encompasses a base station for performing selection within a communication system. The apparatus comprises a transceiver outputting frames received from a remote unit and a switch coupled to the transceiver having the frames as an input and outputting the frames to a selector when a statistic is above a threshold.

The description of the preferred and alternate embodiments will be provided below with respect to determining a base station to perform selection and performing selection within a communication system. However one of ordinary skill in the art will recognize that determining a base station to perform distribution, and performing distribution within the communication system can occur similarly without varying from the scope of the present invention.

Turning now to the drawings, wherein like numerals designate like components, FIG. 1 is a block diagram of communication system 100 in accordance with the preferred embodiment of the present invention. In the preferred embodiment of the present invention, communication system 100 utilizes a CDMA system protocol as described in IS-95A, but in alternate embodiments communication system 100 may utilize other analog or digital cellular communication system protocols that require a frame selection to take place.

Communication system 100 comprises base stations 103–109, each having respective coverage area 117–123, remote unit 113, backhaul 111, switch 101, sidehaul 112, and gateway 115. In the preferred embodiment of the present invention base stations 103–109 are preferably Motorola, Inc. base stations that are configured with processors, memories, instruction sets, and the like, to function in any suitable manner to perform the function set forth herein. Additionally, in the preferred embodiment of the present invention, switch 101 comprises an Asynchronous Transfer Mode (ATM) switch. Backhaul 111 and sidehaul 112 comprise T1 span lines that terminate at switch 101 and each base station 103–109, but in alternate embodiments of the present invention, backhaul 111 and sidehaul 112 may comprise other backhaul and sidehaul means such as Optical Connection 3 (OC3), fiber optic cable, . . . , etc. Finally, gateway 115 may connect communication system 100 to any service network, such as, but not limited to, a Public Switched Telephone Network (PSTN), an Integrated Switched Digital Network (ISDN), an International Telecommunication's Union (ITU) H.323 network, a Wide Area Network (WAN), a Local Area Network (LAN), and an internet network.

As shown, remote unit 113 currently exists in coverage areas 117–121, and is in three way soft handoff with base stations 103–107. In the preferred embodiment of the present invention, a single base station from base stations 103–107 is chosen to perform selection, distribution, and call processing functions for the particular call (i.e., act as a call anchoring base station for the particular call) based on a statistic, which in the preferred embodiment of the present invention is a work-load metric. The determination of the call anchoring base station is made based on the base station with a lowest mean work load (in this example base station 103). During communication with remote unit 113, frames received by non-call anchoring base stations 105 and 107 are backhauled to switch 101 via backhaul 111. Switch 101 then sidehauls the frames to the call anchoring base station (in this case, base station 103), where selection and call processing functions for the particular call takes place. Once selection within base station 103 takes place, base station 103 then backhauls the selected faimne (via backhaul 111) to switch 101. Switch 101 then routes the selected frame to gateway 115.

In the preferred embodiment of the present invention all data that is transmitted to switch 101 is done so in accordance with standard ATM switching techniques. As one of ordinary skill in the art will recognize, data sent to switch 101 is organized into fixed length (53 octet) cells. Each cell contains a five octet header that identifies the cell's destination, or virtual channel. When a sending base station transfers information to a receiving base station, an ATM virtual path identifier (VPI) virtual circuit identifier (VCI) pair would be assigned to the call leg on the involved base station. Switch 101 serves to route the information to the receiving base station.

Figure 2:
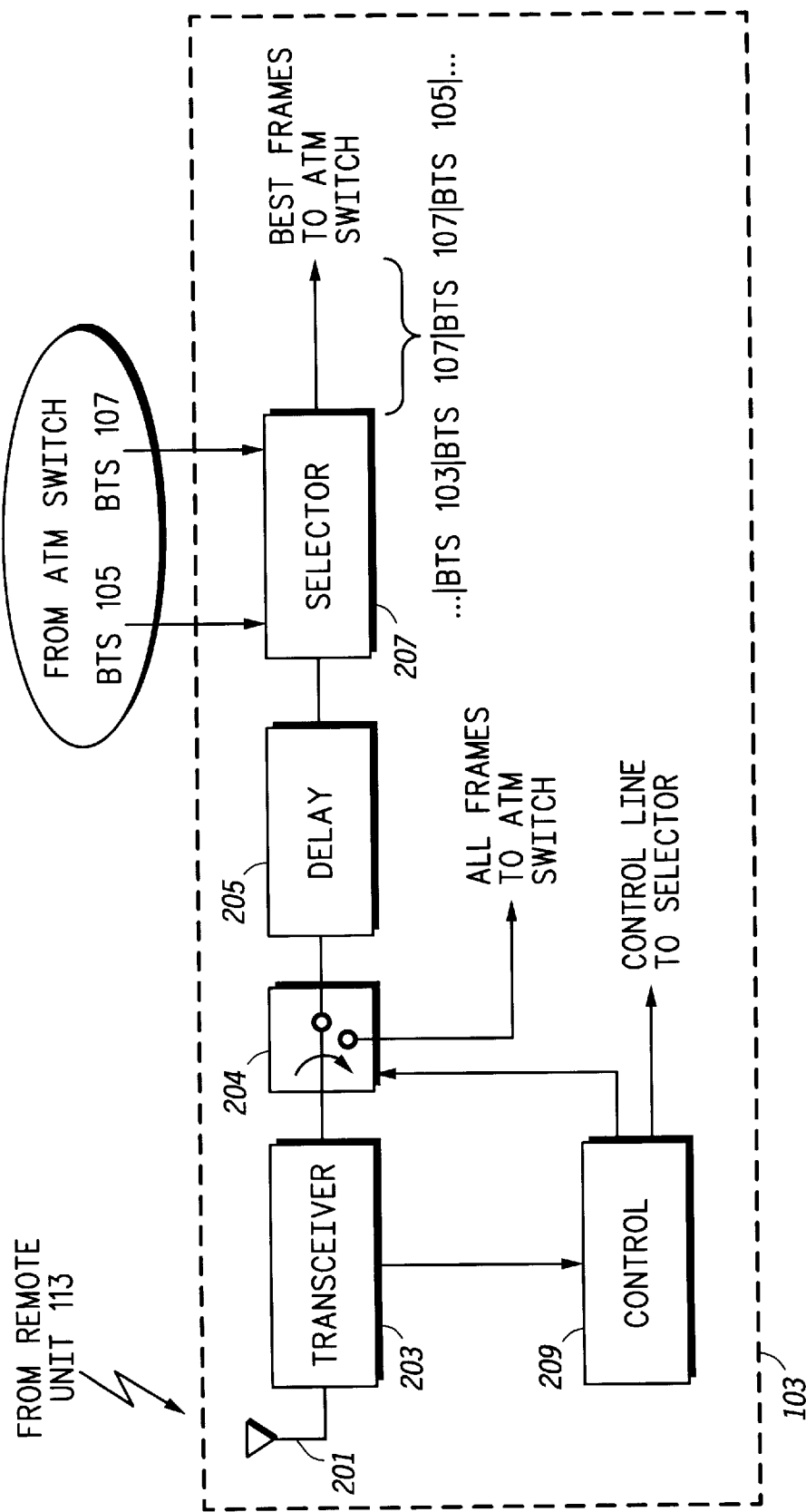
FIG. 2 is a block diagram of a base station of FIG. 1 in accordance with the preferred embodiment of the present invention.

FIG. 2 is a block diagram of a base station 103 of FIG. 1 in accordance with the preferred embodiment of the present invention. Base station 103 comprises antenna 201, transceiver 203, switch 204, delay circuitry 205, selector circuitry 207, and controller 209. In the preferred embodiment of the present invention selection circuitry 207 comprises software/hardware that performs CDMA frame selection. In other words, selector 207 selects the best quality air interface frame from a group of frames that is provided to the selector. During operation of base station 103, control circuitry 209 determines if base station 103 will be performing selector functions or not. As discussed above, the determination of the call anchoring base station is made based on the base station with a lowest mean work load.

During time periods when base station 103 is performing selection, frames received by transceiver 203 are output to switch 204. Controller 209 instructs switch 204 to pass frames received from transceiver 203 to delay circuitry 205 and to selector 207. In the preferred embodiment of the present invention, delay circuitry 205 serves to delay frames for an amount of time so that frames from all base stations in soft handoff with remote unit 113 enter selector 207 simultaneously. Selector 207 receives frames from base stations in soft handoff with remote unit 113, and selects the best frame from all base stations involved in soft handoff with remote unit 113. The best frame is then passed to ATM switch 101, and finally to gateway 115.

During time periods when base station 103 is not performing selection functions for a particular call (i.e., does not have the lowest mean work load of all base stations in soft handoff with remote unit 113), controller 209 instructs switch 204 to pass all frames received from transceiver 203 to ATM switch 101, bypassing selector 207. ATM switch 101 then sidehauls the frames received from transceiver 203 to a call anchoring base station where selection takes place.

It should be noted that in the preferred embodiment of the present invention the decision of whether a base station is going to act as an anchor base station for a particular call is made as described above on a call-by-call basis. Therefore, for each remote unit in communication with a base station, a determination is made as to which base station in soft handoff with the remote unit has the lowest work-load, and that base station performs selection functions. For example, a particular base station may be acting as an anchor base station for a first remote unit, yet may be acting as a non-anchor base station for a second remote unit. During such a situation, the particular base station will be receiving communication from both remote units, each in soft handoff with a particular group of base stations. While acting as the call anchor, the base station has the lowest mean work load for all base stations in soft handoff with the first remote unit, yet will not have the lowest mean work load for base stations in soft handoff with the second remote unit.

Figure 3:
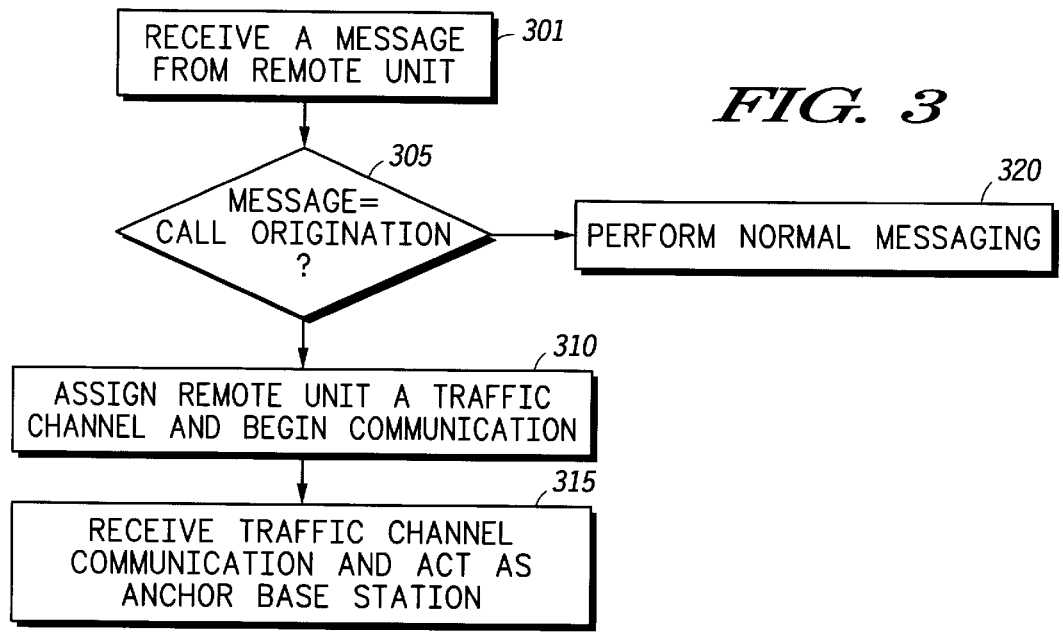
FIG. 3 is a flow chart illustrating operation of the base station of FIG. 1 in accordance with the preferred embodiment of the present invention during a call origination.

FIG. 3 is a flow chart illustrating operation of the base station of FIG. 1 during a call origination in accordance with the preferred embodiment of the present invention. In other words, FIG. 3 is a flow chart showing the operation of base station 103 during those time periods when remote unit 113 first accesses communication system 100. At step 301, base station 103 receives a message from remote unit 113, and at step 305, base station 103 determines if the message is a call origination message. If, at step 305, base station 103 determines that remote unit 113 has sent a call origination message, then the logic flow continues to step 310 where base station 103 assigns remote unit 113 a traffic channel and begins communication with remote unit 113 via the traffic channel. At step 315, base station 103 receives transmissions from remote unit 113 and acts as the default anchor for the call, routing all frames to ATM switch 101. Thus, in the preferred embodiment of the present invention during all call originations, the base station receiving the call origination will automatically default to performing anchor functionality until soft handoff legs are added to the call. Returning to step 305, if base station 103 determines that the message sent from remote unit 113 is not a call origination message, then the logic flow continues to step 320, where normal messaging takes place (e.g., pages, page responses, registrations, . . . , etc.) between remote unit 113 and base station 103. The logic flow then returns to step 301.

Figure 4:
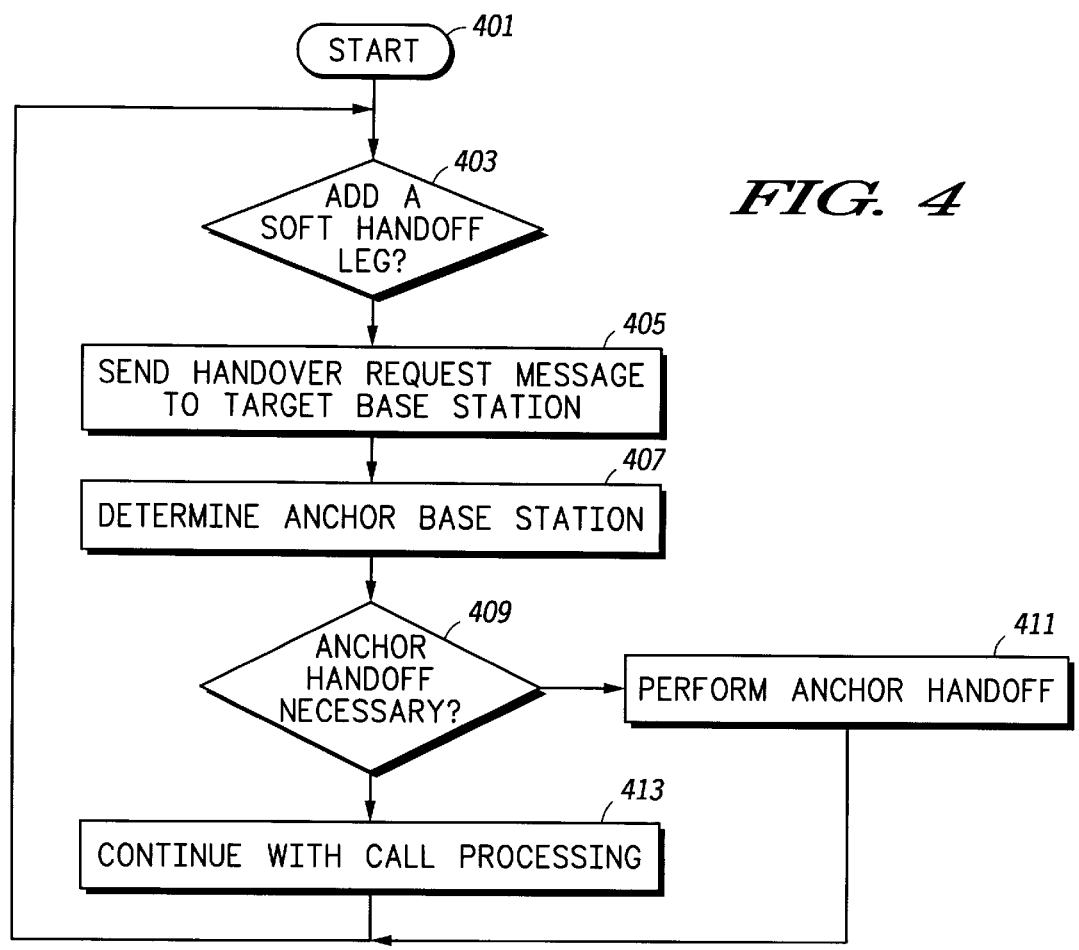
FIG. 4 is a flow chart illustrating operation of the base station of FIG. 1 during soft handoff in accordance with the preferred embodiment of the present invention.

FIG. 4 is a flow chart illustrating operation of base station 103 in accordance with the preferred embodiment of the present invention during soft handoff. The logic flow begins at step 401 where remote unit 113 has successfully originated a call, and is communicating with base station 103. As described above with reference to FIG. 3, base station 103 is performing anchor functionality until soft handoff legs are added to the call. At step 403, controller 209 determines if a soft handoff leg should be added to the call. This is accomplished by control circuitry 209 receiving a signal strength measurement (IS-95A Pilot Strength Measurement Message (PSMM)) of a neighboring base station and determines if the PSMM is greater than a threshold (IS-95A T_ADD). If at step 403, it is determined that a soft handoff leg should be added to the current call, then the logic flow continues to step 405 where a handover request message is routed to the target base station (e.g., base station 105). In the preferred embodiment of the present invention the handover request message is routed from control circuitry 209 through switch 101, and finally to target base station 105.

At step 407 a determination is made as to which base station (i.e., base station 103 or base station 105) should serve as the call anchoring base station. As discussed above, the call anchoring base station is chosen based on the current work load for each base station, and the base station having the lowest mean work load is chosen to perform anchor functionality. Next, at step 409, controller 209 determines if an anchor handover is necessary. In other words, controller 209 determines if base station 105 should be performing anchor functionality for the particular call (i.e., selection and call processing/control). If at step 409 it is determined that an anchor handover is necessary, then the logic flow continues to step 411 where an anchor handoff is performed, and base station 105 begins performing anchor functionality for the particular call and the logic flow returns to step 403. However, if at step 409, it is determined that an anchor handoff is not necessary, then at step 413 base station 103 continues performing anchor functionality (i.e., selection and call processing/control) and the logic flow returns to step 403.

Figure 5:
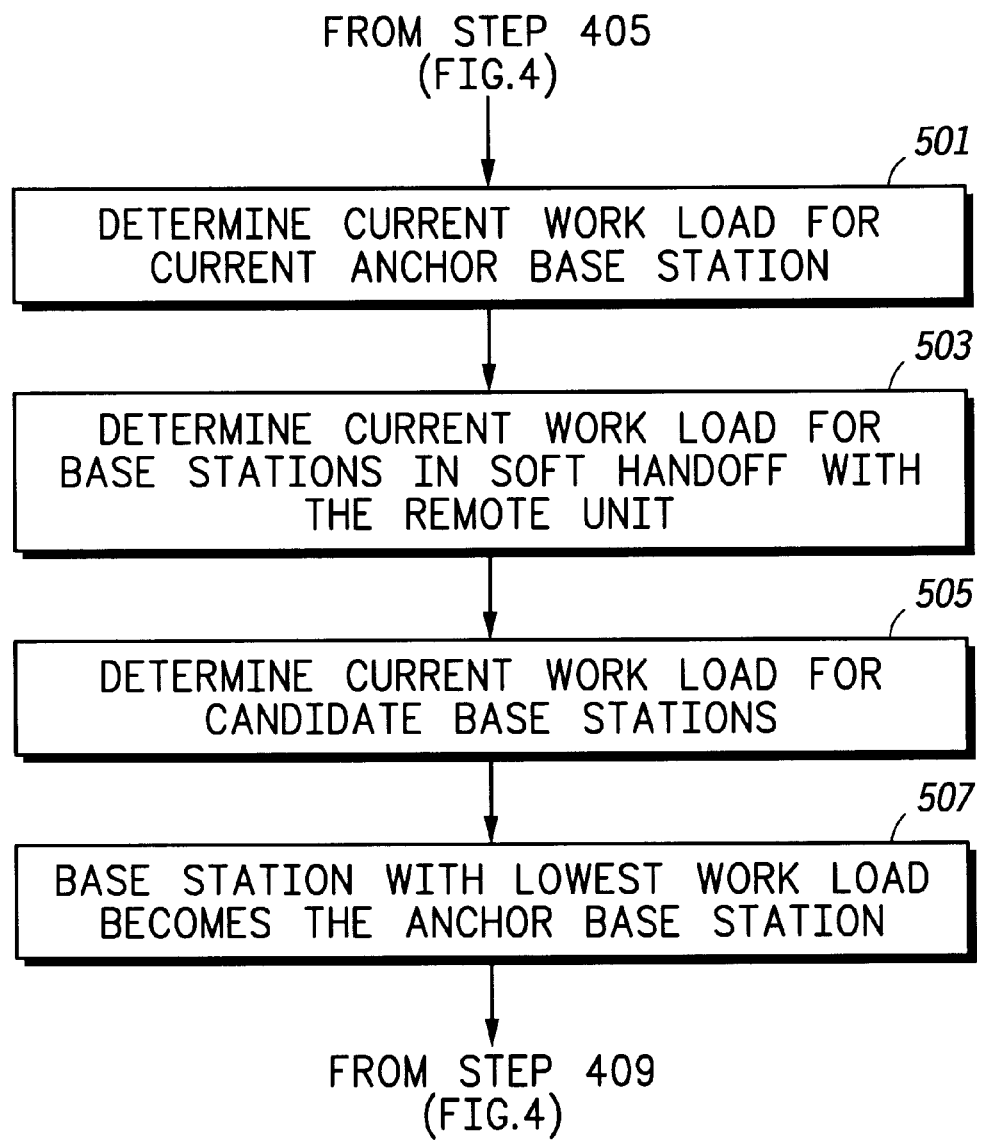
FIG. 5 is a flow chart showing the selection of a call anchoring base station in accordance with the preferred embodiment of the present invention.

FIG. 5 is a flow chart showing the selection of a call anchoring base station in accordance with the preferred embodiment of the present invention (step 407 of FIG. 4). The logic flow begins at step 501 where controller 209 determines the current work load for the current call anchoring base station (i.e., base station 103). In the preferred embodiment of the present invention the current work load is defined as being the current backhaul utilization for the call anchoring base station. Next, at step 503, a current work load for base stations in soft handoff is determined. In the preferred embodiment of the present invention this is accomplished by sending all base stations currently in soft handover with remote unit 113 (i.e., all base stations within the IS-95A active set) a request to provide the current call anchoring base station with a current work load metric. In the preferred embodiment of the present invention the request for the current work load metric takes place by transmitting a control message to all base stations within the IS-95A active set via switch 101 in accordance with standard ATM switching techniques.

In alternate embodiments of the present invention, other forms of determining the current work load for base stations within the active set are envisioned. For example, in an alternate embodiment of the present invention, the call anchoring base station receives periodic updates of the work load for all base stations within the active set along with sidehauled frame information. During the alternate embodiment of the present invention, those base stations that are not acting as a call anchoring base station for the particular call, will periodically deliver a work load metric to the call anchoring base station along with the voice/data frame sent to the call anchoring base station.

Continuing, at step 505 a current work load is determined for the candidate base station (i.e., base station for which soft bandover is requested). As in the preferred embodiment of the present invention this is accomplished by sending the candidate base station a request to provide the current call anchoring base station with a current work load metric and receiving the response from the candidate base station. Finally, at step 507 a base station having the lowest work load is determined. For example, if the current call anchoring base station is utilizing 80% of its backhaul capacity, and a anchor candidate base station is utilizing 50% of its backhaul capacity, then the anchor candidate base station has a lower work load than the current call anchoring base station. The logic flow continues to step 409 (FIG. 4).

While the invention has been particularly shown and described with reference to a particular embodiment, it will be understood by those skilled in the art that various changes in form and details may be made therein without departing from the spirit and scope of the invention, and it is intended that such changes come within the scope of the following claims.

What is claimed is:

1. A method for performing selection within a communication system, the method comprising the steps of:

receiving at a base station, a first communication from a first remote unit in soft handoff with a first plurality of base stations;

receiving at the base station, a second communication from a second remote unit in soft handoff with a second plurality of base stations;

determining a statistic for the base station, the first plurality of base stations, and the second plurality of base stations;

performing selection functions for the first communication from the first remote unit based on the statistic; and failing to perform selection functions for the second communication from the second remote unit based on the statistic.

2. The method of claim 1 wherein the step of determining the statistic comprises the step of determining a work-load metric for the base station.

3. The method of claim 1 wherein the step of performing selection functions based on the statistic comprises the step of selecting a best frame from a plurality of frames based on the statistic.

4. The method of claim 3 wherein the step of selecting the best frames comprises the step of receiving frames from the first plurality of base stations in soft handoff with the remote unit and selecting the best frame from the first plurality of base stations.

\* \* \* \* \*